Fig. 1

Feb. 18, 1936.   M. MAUL   2,031,569
VERIFYING MACHINE FOR PERFORATED RECORDS
Original Filed Sept. 15, 1930   4 Sheets-Sheet 4

Fig. 11

Inventor:
Michael Maul

Patented Feb. 18, 1936

2,031,569

UNITED STATES PATENT OFFICE 2,031,569

VERIFYING MACHINE FOR PERFORATED RECORDS

Michael Maul, Berlin-Johannisthal, Germany

Original application September 15, 1930, Serial No. 482,008. Divided and this application August 2, 1934, Serial No. 738,163. In Germany September 28, 1929

16 Claims. (Cl. 73—51)

The present invention relates to verifying machines for perforated records and more particularly for perforated record cards, and is a division of my copending prior application Ser. No. 482,008.

It is the main aim of the present invention to provide a verifying machine for perforated record cards having a plurality of superpositioned record decks wherein each deck comprises a plurality of adjacent record columns.

Another object of the invention is to provide a machine of the type indicated which is adapted for the verification of hole combinations.

A further object of the invention is to provide a verifying machine for perforated record cards having a plurality of record decks wherein each deck comprises a plurality of adjacent record columns in which machine a set of verifier keys for a single record column is not only adapted for column by column verification of a record card but may be selectively used for the verification of the columns in any one of said plurality of record decks.

A further object of the invention is to provide in a verifying machine of the type indicated an individual set of analyzing means for each record deck and means for selectively connecting said verifier keys to any one of said sets of analyzing means for the various record decks, error detecting means being provided in said machine which are under the joint control of the verifier keys and the record column under verification.

A further object of the invention is to provide a machine of the type indicated wherein for each record deck an individual set of analyzing means for only a single record column is provided.

Still another object of the invention is to provide a machine of the type indicated wherein a common set of error indicating means is provided which is operatively connected to said set of verifier keys and wherein said common error detecting means as well as said set of verifier keys may be selectively connected to the analyzing means of any one of said record decks.

A further object of the invention is to provide means for indicating by the position of the selecting means which of the record decks is selected for verification.

A further object of the invention is to provide an electrical machine of the type indicated having preferably electrical error detecting means adapted to prevent feeding of the perforated record card column by column upon detection of an error.

Other objects and advantages of the invention will be seen from the following specification and the claims and the drawings which illustrate one embodiment of the invention.

The machine illustrated comprises a frame upon which the card is moved step by step underneath a row of analyzing fingers. The frame is mounted upon a casing in which the key mechanism is provided, under the control of which the perforations in each column are to be verified. Upon detection of any incorrectness, this fact is brought to the attention of the operator by preventing the carriage feed.

*Carriage feed mechanism*

The perforated record card 12 (Figs. 1 and 2) is moved upon the bed 13 of the frame 14 of the machine step by step by means of the carriage (still to be described) from the extreme right hand position to the extreme left hand position. The generally known carriage comprises the end pieces 15 and 16 between which the card is inserted and a ratchet bar 17 for the step by step shifting of the carriage. The end pieces 15 and 16 as well as the shift bar 17 are fastened to guide pieces 18 and 19 running in grooves 20 of the frame 14. The ratchet bar 17 is controlled by an escapement 21 being under the electromagnetic control of the keys. The escapement 21 is mounted between two lips 22 and 23 (see Figs. 2 and 3) and is drawn upwardly by means of two springs 24 and 25 into engagement with the teeth of the ratchet bar 17 in such a way that normally the left tooth of the escapement 21 is in engagement with the ratchet bar 17 and that the spring 24 is strong enough to overbalance the tension of spring 25 and also the action of a spring actuated cord 26 tending to move the carriage to the left. The escapement is guided in a slot by means of a pin 27 provided on the lip 22 and is drawn against the stop 28. To move the carriage one step to feed the next record column of the card underneath the analyzing means the magnet 29 must be energized; this magnet rocks the escapement 21 in counterclockwise direction (Fig. 2) about its pivot 27, thereby engaging the right hand tooth of the escapement 21 with the ratchet bar 17, but without permitting the latter to shift for the next step. As soon as, however, the magnet 29 is deenergized, spring 24 will return the escapement 21 to its home position and the left hand tooth of the escapement then comes slightly behind the point of a tooth of the ratchet bar, so that the spiral spring arranged within the casing 30 moves the ratchet bar 7 by means of the cord 26 to the left until the next face of a tooth of the bar 17 is stopped by the left tooth of escapement 21 in which case the carriage has just been moved for one card column.

If it is desirable to return the carriage to its extreme left hand position not by a step by step movement but by entirely releasing the same to enable it to return to its extreme left hand position, then the magnet 31 (Figs. 2 and 3) provided on the projection 23 must be energized; this magnet will attract the armature 32 fastened on the escapement against the action of springs 24 and 25, thereby drawing the escapement 21 downwardly and entirely disengaging the same from the ratchet bar 17, using the pins 27 and 28 as guides for the escapement. Then the carriage will be moved under the influence of the spring provided within the casing 30 to its extreme left position.

If the carriage is in the extreme right hand position, the first record column of an inserted record card 12 (Fig. 1) is just below the analyzing fingers 33 underneath which the card is moved to the left step by step. If, however, the last (extreme right hand) column of the card is below the analyzing points of the fingers 33, the carriage is not yet in its extreme left position but is permitted to move one step further; this provision has been made to indicate any incorrectness in the last record column by locking of the card feed in the same way as upon any incorrectness in any of the remaining record columns.

Figure 1:
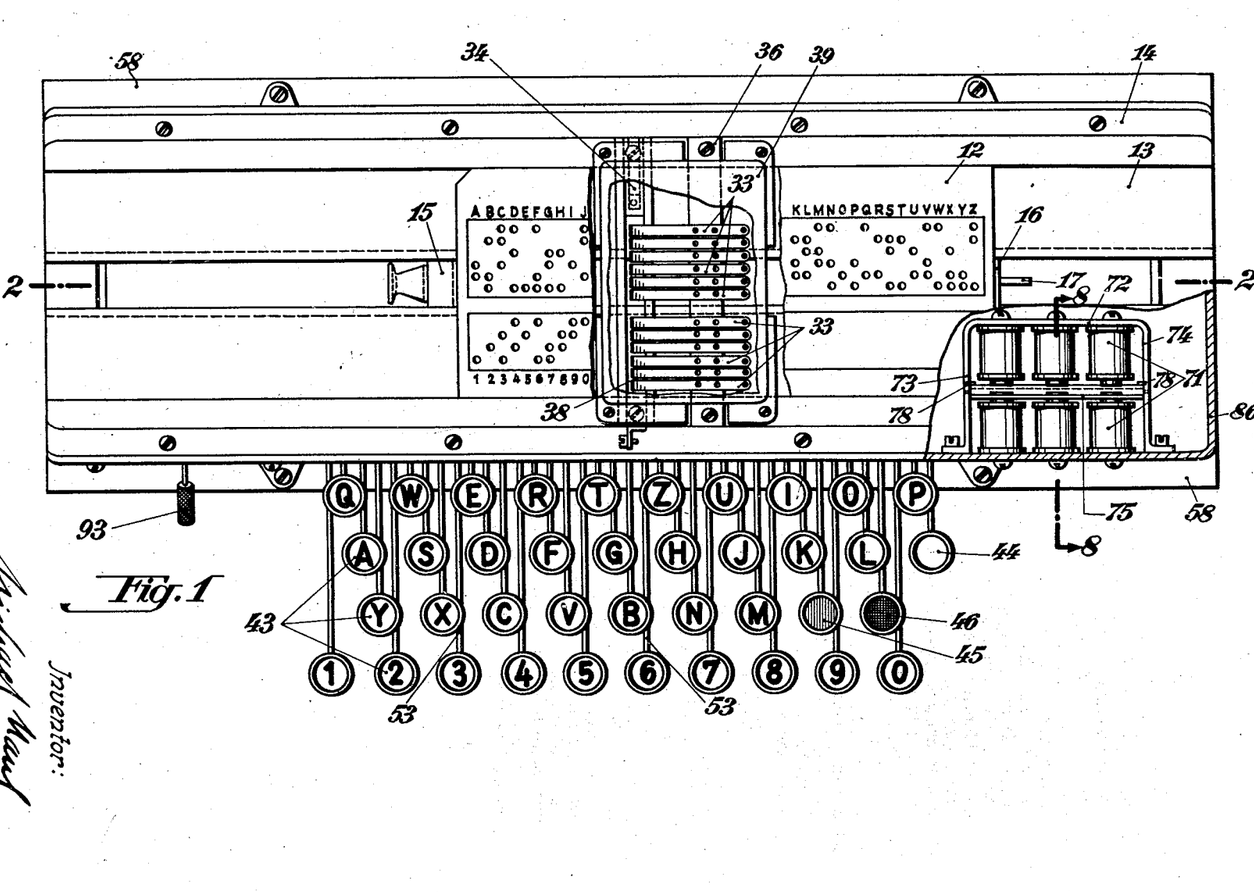
Fig. 1 is a top view of the verifying machine.
Figures 2, 3, 4, 5:
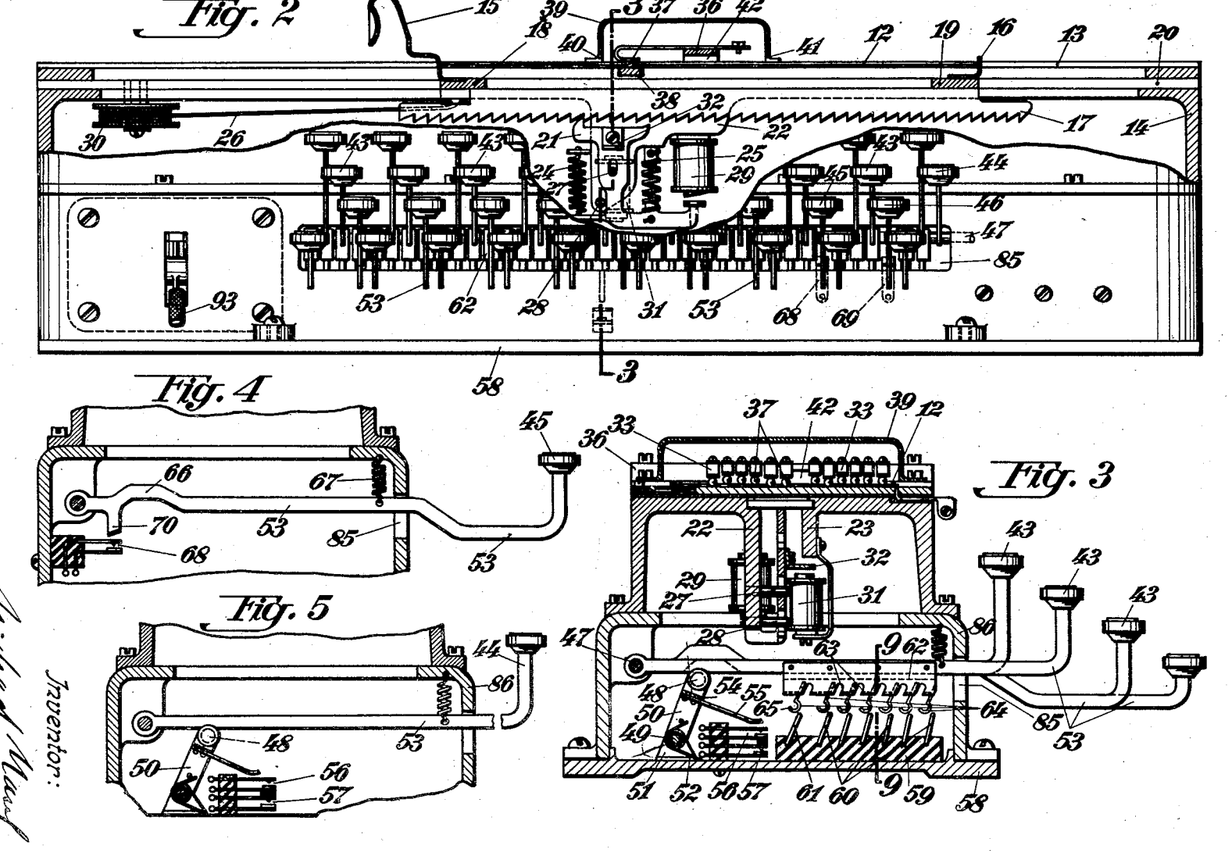
Fig. 2 shows the verifying machine partly in section and partly in front view, the section being taken on line 2—2 of Fig. 1.
Fig. 3 is a cross section through the machine according to line 3—3 of Fig. 2.
Fig. 4 is a detail view representing the special key arrangement for the carriage control.
Fig. 5 is also a detail view and represents the no-perforation verification key.

The record card 12 of which in Fig. 1 a part is broken away while it is shown completely in Fig. 2, comprises an upper and a lower deck of combinational holes; in the upper deck are letters and in the lower deck are numerals symbolically represented by combinational holes. In the example illustrated any known hole combination code is used. However, any other code could be provided for the various letters as well as for the numerals and the chosen code is quite immaterial for the scope of the present invention. It is only necessary, however, to make provisions in the machine in accordance with the predetermined selected code.

Figure 10:
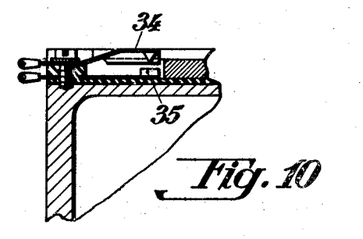
Fig. 10 shows in an enlarged scale the card contact connecting the verifying mechanism with the current source only if a card is inserted in the machine.

In the present machine the verifying mechanism is connected with the current source by the insertion of a card in the machine. Thereby the so-called card contact (Figs. 1 and 10) is closed. This contact comprises a flat spring 34 normally extending slightly beyond the bed 13 of the frame 14, and cooperating with a contact piece 35 to close the current circuit. The contact spring 34 is bent on the sides to avoid any interference with the card during movement of the same. If a card is in the machine in any position, it will press the contact spring 34 downwardly thereby closing a circuit over 34, 35.

Analyzing mechanism

The analyzing mechanism comprises two sets of contact fingers 33 (Figs. 1-3), each set consisting of six fingers and all fingers serving for the analysis of the upper and lower hole combination decks. The analyzers 33 as well as various other means still to be described are designated by Roman numbers in accordance with their hole coordination. The upper six fingers 33 (Fig. 1) analyze successively the columns of the upper hole combination deck, each column consisting of six hole positions. Since the lower deck requires for the representation of the numerals only four hole positions, there are only four analyzers of the lower six analyzers 33 necessary. There are, however, two analyzers more provided so that the lower group comprises also six analyzers to permit, if necessary, verification of cards having as well in the upper as in the lower hole combination deck letter characters. Of course, the number of the analyzing fingers required depends entirely upon the number of hole positions which are necessary for the representation of the various combinations; so that a verifying machine which shall verify only numerals and no letters would require only four analyzing fingers. The fingers 33 are fastened upon an insulating piece 36 transversely mounted upon the frame 14, and the front ends of said fingers are bent and provided with contact buttons 37. In each hole position whereon a perforation is provided the coordinated contact buttons 37 will pass through the holes and establish a conducting connection with the contact bar 38 as shown for instance in Fig. 3 by various contact fingers. The analyzing mechanism is covered by a protection cover 39 having on opposite sides recesses 40 and 41 (Fig. 2) to permit movement of the end pieces 15 and 16 of the carriage in close proximity to the contact bar 38. For the same purpose the insulating bar 36 is provided in its middle portion with a recess 42 to permit movement of the angle 18 underneath said bar.

As will still be described the upper or lower set of six analyzing fingers may be selectively connected by means of a switch with a common set of six controlling magnets. Each analyzing finger of the selected set is then included in the circuit of the one winding of a magnet coordinated to the respective contact finger. While the second winding of each of said magnets is under key control, the first mentioned windings of said magnets will be included in the verifying circuit whose contact fingers 33 pass through holes of the selected hole combination deck.

Key mechanism

For the verification of the hole combinations in any column of the upper or lower deck, verifier keys 43 (Figs. 1-3) are provided bearing a certain letter or numeral designation. In addition to said keys there is also provided a no-perforation verification key 44. For the control of the carriage are provided a shift key 45 and a release key 75

Figure 9:
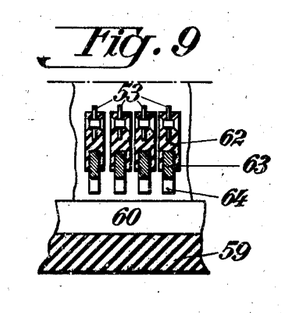
Fig. 9 is a detail view representing in an enlarged scale a section through the key levers.
Figure 11:
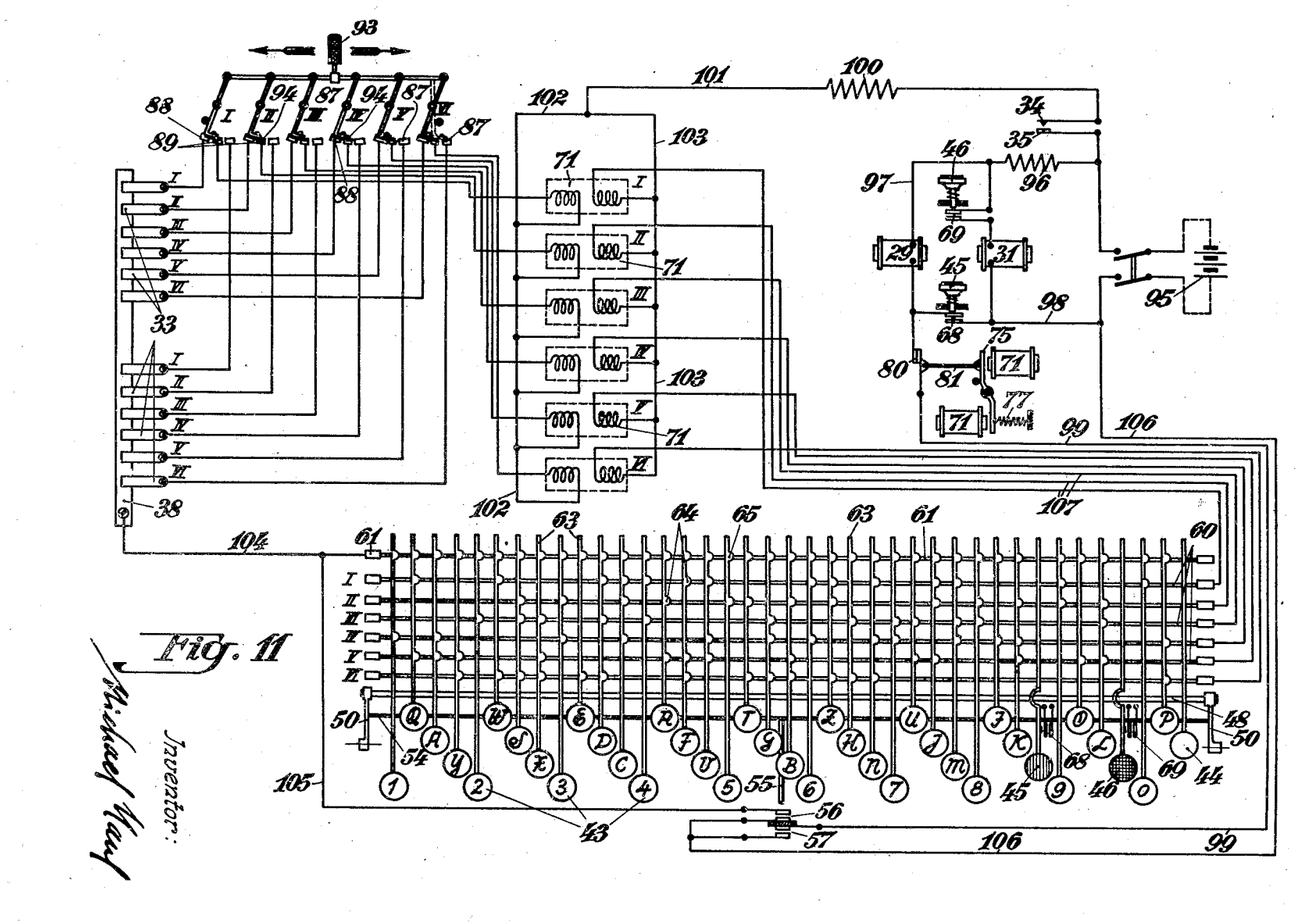
Fig. 11 shows the wiring diagram of the machine.

46 which may be distinguished for instance by different colours. The key levers 53 of all keys are arranged upon a cross bar 47 (Fig. 3) and are held in their upper normal position by means of a stirrup still to be described, as well as by means of springs, in a similar way as shown in Fig. 4; in this position the key levers engage the upper edge of a key slot 85 provided in the casing 86. By means of spacer tubes arranged upon the bar 47 (but not shown in the drawings) the key levers are kept in the proper distance from each other. The means which in addition to the aforesaid springs serve to hold all letter and number keys resiliently in their upper position, comprise a rigid stirrup frame including two cross bars 48 and 49 connected on their sides by yokes 50. The bar 49 is pivotally mounted in stands 51 and the yokes 50 tend to turn in clockwise direction due to springs 52 wound around the bar 49, so that said bar keeps the key levers 53 resiliently in their upper position. The yokes 50 are also connected with each other by a cross bar 54 bearing in its middle portion a finger 55, adapted to cooperate with the contacts 56 and 57 which are insulatingly arranged from each other. If therefore any of the letter or numeral keys is depressed, the stirrup 48, 49, 50, 54 will be pressed downwardly against the tension of springs 52, and finger 55 closes first contact 56, and if the key reaches the lowermost position also contact 57 will be closed, thereby controlling shifting of the carriage. The base plate 58 upon which the casing 86 is mounted bears also the insulating block 59 having contact bars 60 running across the key levers to cooperate with contact fingers of said key levers in different combinations as will still be described. A further contact bar 61 forms the common return line. As may be seen from Fig. 3 and the detail view according to Fig. 9, each key lever is provided with an insulating bar 62 having a contact bar 63 inserted therein on the lower side. The bars 63 of the key levers are provided with contact fingers 64 in different combinations; the bars 63 of the key levers carry in addition to said fingers 64 a contact finger 65, being therefore in conducting connection with said fingers 64. Each key lever, i. e. each letter key as well as each numeral key has a finger 65, while the fingers 64 are only arranged according to the perforations of the hole combinational code as illustrated in Fig. 1. Therefore the 6 numeral key has only in extreme left position (Fig. 3) and in the fourth position from the left a finger 64 as may be clearly seen from the diagram in Fig. 11 while the letter key E has only a finger 64 on the extreme right hand end (Figs. 3 and 11). The arrangement of said contact fingers and their agreement with the hole combinational code may also be clearly seen from a comparison of Figs. 1 and 11, so that a further explanation may be dispensed with. Provision in the distances and the timing has been made that at first all fingers 64 and finger 65 of the depressed key contact with the bars 60 and 61 respectively and that upon further depression of the key finally the contact 56 and in the lowermost position of the key the contact 57 will be closed. If the key is released, all parts return under the influence of the stirrup 48, 49, 50 to their home position and the flat spring contacts 56, 57 open again. The keys 45 and 46 (see Figs. 1, 2 and 4) for the control of the carriage independently of any verifying operation are both similarly constructed and therefore only one of them is shown in Fig. 4.

These keys are provided with an offset portion 66 and are therefore not held in their upper position by the stirrup 48, 49, 50, but for this purpose a special spring is coordinated to each key. Upon depression of any of said keys the aforesaid stirrup will therefore not be rocked and the contacts 56, 57 (Fig. 3) will remain open. However, to each of said keys 45, 46 is a special contact 68 and 69 respectively coordinated being closed by a projection 70 upon depression of the key. For the verification of a column in which no perforation should be present, there is provided the no-perforation verification key 44 (Figs. 1, 2 and 5). This key rests upon the bar 48 and is therefore held in its upper position by the stirrup 48, 49, 50 in addition to its spring, so that upon actuation of the key the contacts 56, 57 will be closed. To this no-perforation verification key are, however, no contact fingers 64, 65 coordinated but the same controls only the aforesaid stirrup.

*Verification mechanism*

Figure 6:
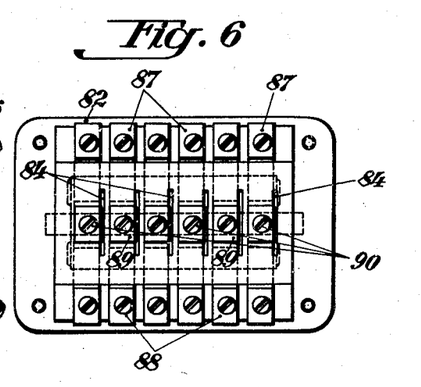
Fig. 6 shows in an enlarged scale a top view of the switch for the selective verification of any of a plurality of record decks.
Figure 7:
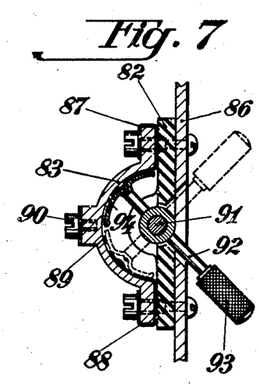
Fig. 7 is a section through the switch shown in Fig. 6.
Figure 8:
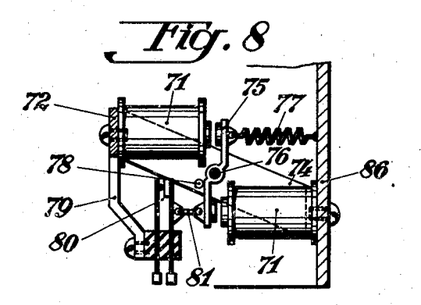
Fig. 8 shows in an enlarged scale a section through the verifying mechanism comprising a plurality of magnets.

The verification mechanism proper of the machine adapted to selectively cooperate with the upper or lower contact fingers 33, comprises six electro-magnets 71 (Figs. 1 and 8) each having two individual windings through which, if energized, current flows in opposite direction, so that upon the simultaneous energization of both windings no magnetic influence will be exercised. The one group of said magnets is mounted upon the right side of the front wall of the casing 86; on this wall is also fastened a frame 72, 73, 74 extending upwardly within said casing and carrying the other group of magnets 71. Between both arms 73 and 74 of the frame is an armature plate 75 pivotally mounted at 76, the one half of said plate forming the common armature of the upper group of magnets and the other half forming the common armature of the lower group of magnets. The armature plate is normally drawn by the spring 77 against stops 78 fastened on the arms 73 and 74. The stirrup 72, 73, 74 carries about in its middle portion a projection 79 (Fig. 8) having insulatingly arranged thereon a flat spring contact 80; the one plate of said contact is connected by connection 81 with the armature plate 75. If therefore any of the magnets 71 or a plurality of said magnets are energized in such a way that the magnetic forces are not compensated but execute an influence upon the armature plate 75, the latter will be rocked in clockwise direction (Fig. 8) and the contact 80 controlling the card carriage feed, will be opened. For the selection of any of the analyzing sets for verification, the common set of verifier magnets is provided with a switch illustrated in Figs. 6 and 7; the position of said switch within the current circuit will still be explained in connection with Fig. 11. This switch comprises an insulating plate 82 fastened to the front wall of the casing 86. Upon said insulating plate is fastened an arcuate longitudinal insulating piece 83 having slots 84. On the upper and lower inner side of the piece 83 are provided respectively six contact springs 87 and 88 which lead all to the outside and are fastened there by corresponding screws. These contact springs (Fig. 7) may therefore cooperate on the inner side of the insulating piece 83 with a contact lever still to be described, and at the same time they may be connected on the outside from the contact screws to the respective lines. On the inner side of the insulating piece 83 there are further provided six contact springs 89 being in alignment with the contact springs 87 and 88 and being arranged separately from the aforesaid springs 87 and 88 and having their side lips guided through slots 84 to be connected by means of screws 90. Upon the shaft 91 is an arm 92 pivotally mounted having a handle 93 extending through the casing 86 (see also Figs. 1 and 2). The lever 92 comprises six contact springs 94 being in line with the contact springs 87 and 88. As may be seen from Figs. 6 and 7, all six contact springs 87 are connected with the contact springs 89 through the bridged contacts 94 if the lever is in the lower position as shown in Fig. 7. If, however, the lever is moved to the upper position, indicated in dotted lines, the contacts 87 are free and a connection will be established between the contacts 89 and 88. As may be seen from the drawings, the contact springs are slightly depressed in their middle portion, so that they may be resiliently moved and stay adjusted in their adjusted position. From the contact screws 90 connections are provided to the six magnets 71 while the upper contacts 87 are connected with the lower set of analyzing fingers 33 (Fig. 1) and the lower contacts 88 are connected with the upper set of analyzing fingers 33. If therefore the lever 93 is in the lower position (Figs. 2 and 7) the lower six analyzing fingers 33 are in operative connection for verification of the lower hole combination deck while the upper analyzers are free; if the lever 93 is moved to its upper position, the lower analyzers are free and the upper ones are in operative connection for verification.

*Circuit diagram*

The electric wiring of the above described parts will now be described in connection with the diagram shown in Fig. 11. By means of the main switch the machine may be connected with the current source 95. The contact 69 controlled by the releasing key 46 and the releasing magnet 31 are then over the resistance 96 in direct connection with the current source. From the resistance 96 branches a line 97 to the shift magnet 29, which line branches again, leading on the one hand over contact 68 controlled by the shift key 45 and line 98 back to the current source, and on the other hand over the normally closed contact 80, line 99, and over contact 57 being closed if finger 55 is depressed back to the current source. The contact 80 is normally closed and will only be opened if one or a plurality of the magnets 71 become energized. From the upper side of the current source the line leads over card contact 34, 35, resistance 100 and the common line 101 to two branch lines 102 and 103. To the line 102 are connected the one ends of the analyzing windings of the controlling magnets 71, and the other ends of these windings lead to the contact fingers 89 of the switch, said fingers being coordinated to said windings. From the upper and lower set of analyzing fingers 33 lead corresponding lines to contacts 88 and 87 respectively and in accordance with the position of switch 93 the analyzing windings of magnets 71 are connected either with the upper group of contact fingers 88 or with the lower group of contact fingers 33, in each case leaving one set of the contact fingers free, to prevent the holes under said fingers from effecting any controlling operation. In Fig. 11 the switch is shown contrary to the illustration in the other figures as being shifted to the upper hole combinational deck since the operation of the machine will still be illustrated in verifying said deck. From the common bar 38 of the contact fingers 33 leads a line 104 to the common contact bar 61 of key 43, and from the line 104 branches also a line 105 leading to the contact 56 establishing the connection with the line 106 which leads back to the current source. In Fig. 11 the keys are illustrated diagrammatically in such a manner that the key levers represent the metal bars 63 being provided in accordance with the hole combinational code of Fig. 1 with fingers 64 coacting with the contact bars 60 in such a way that upon depression of any of the keys 43, the common bar 61 is connected with those selecting bars 60, on which the key levers 63 are provided with contact fingers 64. The contact bars 60 are connected on the right hand end by lines 107 with the one end of the key windings of magnets 71 and the other ends of the key windings are connected to the common line 103. If therefore any key is depressed, between the bar 61 and the bars 60 connections will be established corresponding to the number and to the arrangement of the contact fingers 64. Simultaneously therewith, upon actuation of any key, the stirrup 48, 49, 50 will be rocked and contacts 56 and 57 will be closed by finger 55.

It will be seen, that the normally closed contact 80 controls the operation of the carriage shift magnet 29. Since upon each actuation of a letter or numeral key or also upon actuation of the no-perforation verification key 44 the contact 57 will be closed, the magnet 29 may be energized provided contact 80 is closed, and if magnet 29 becomes deenergized upon return of the depressed key the carriage is permitted to shift to the next column. As may be seen from the following explanation of the operation of the machine, this shifting occurs only if the actuated key and the perforation of the column to be verified are in complete agreement while upon any incorrectness the contact 80 will be opened by any of magnets 71 thereby preventing the energization of carriage shift magnet 29.

*Operation of the machine*

The record card to be verified is inserted in the bed 13 (Fig. 1) of the machine if the carriage is in its extreme left hand position whereupon the carriage is moved by means of end piece 15 to the right, thereby positioning the first column of the record card under the analyzing fingers 33. If the card is inserted in the machine, the verifying mechanism will be connected with the current source due to the closure of card contact 34, 35, and this closure will be maintained as long as the card is inserted in the machine. If now the hole combinational field to be verified is to be selected, the switch lever 93 (Figs. 1 and 2) is moved to the upper or lower position; if moved to the upper position, the upper analyzing fingers 33 will be connected with the common set of controlling magnets and the lower analyzing fingers 33 are free while in the other case the lower set of analyzing fingers 33 will be connected with the controlling magnets and the upper analyzing fingers 33 are disconnected. If now the data of the first column of the upper hole combinational field are to be verified, the operator presses the corresponding verifier key 43; if therefore for instance in the first column the letter A shall have been punched, the A verifier key is to be depressed. However, already before actuation of the verifier key, due to the perforations in the first column (see perforating scheme according to Fig. 1) the analyzing fingers 33 in the IV- and V-position (Fig. 11) have passed through the corresponding holes of the card, thereby including the analyzing windings of the IV- and V-controlling magnets in the verifying circuit. As soon as the A key has been slightly moved downwardly its corresponding contact fingers 64 being provided in accordance with the perforation scheme of Fig. 1 on the IV- and V-position (Fig. 11), will establish an electrical connection with the IV- and V-contact bars 60; thereby a connection will be established over the key windings of the IV- and V-magnets from line 103 to the bars 60 and over the contact fingers 63 to the common contact bar 61. Upon depression of the verifier key, the finger 55 will encounter the contacts 56 and 57 and will close the same after the contact fingers 64, 65 have been brought into contact with the corresponding bars 60, 61. Simultaneously with closure of contact 56 the circuit for the inserted analyzing and key windings of the controlling magnets will be closed. If therefore the perforation of the card and the key actuation are actually in agreement, the analyzing windings and key windings of the selected magnets 71 will compensate each other so that no influence whatsoever is effected upon the armature plate 75. Upon closure of contact 56 consequently to the actuation of the A key, the following circuit (Fig. 11) will therefore be established: From the upper pole of the current source 95 over the card contact 34, 35, resistance 100, line 101 branching into the common lines 102 and 103. From the common line 102 flows upon verification of the hole combination A (compare perforation in Fig. 1) a current through the analyzing windings of the IV- and V-controlling magnets 71 and from there to the contacts 89 of the IV- and V-position. From these contacts a current flows over shift contact 94 to the respective contacts 88 and from there to the contact fingers 33 of the IV- and V-position. Since said contact fingers pass through the holes of the card, the current flows through the common contact bar 38, line 104, line 105, contact 56 now being closed, and line 106 to the lower pole of the current source. Simultaneously therewith a current will also flow from the common line 101 over the line 103 through the key windings of the IV- and V-controlling magnets and through the corresponding lines 107 of the IV- and V-contact bars 60, from there over the contact bar 63 of the verifier key A and contact finger 65 to the common contact bar 61, whereupon this current will join in the common line 105 with the current coming through line 104 from the analyzing windings and will flow over contact 56 and line 106 to the lower pole of the current circuit. As will be seen, the analyzing windings as well as the key windings of the IV- and V-controlling magnets 71 will be energized simultaneously, so that the armature plate 75 being under the control of said magnets will remain in its home position. If therefore, upon reaching of the lowermost key position, the carriage shift contact 57 is closed, the shift magnet 29 may be energized from the upper pole of the current source 95 over resistance 96, line 97, magnet 29, contact 80 now being closed, line 99, contact 57 and line 106 back to the lower pole of the current source. If thereafter the key returns to its home position after deenergization of the magnet 29 the carriage is permitted to shift, thereby manifesting that the hole combination is properly punched and that the verification of the next record column may be effected.

It will be clearly seen that the same operations will take place if ever a hole combination is in agreement with the actuated verifier key, and in all these cases the contact 80 remains closed and the carriage shift magnet 29 may be energized so that the carriage is permitted to feed the next record column under the analyzing fingers 33.

If, however, any of the incorrectnesses still to be mentioned in the following specification is present, i. e. if the hole combination is wrong or comprises too few or too many holes, certain windings of the controlling magnets will not be compensated but either one or a plurality of the key windings or analyzing windings will become effective, so that consequently to the rocking of the armature plate 75 contact 80 will be opened. The magnets 71 will be energized by closure of contact 56 being effected prior to said energization and before the contact 57 is closed upon further depression of the key. In case that any magnet windings are not compensated, the armature plate 75 will be rocked and therefore the contact 80 is already opened before the contact 57 may be closed by the finger 55. Therefore the line 97, 99, 106 of the carriage shift magnet 29 now being closed at contact 57, is open at the contact 80 so that the shift magnet 29 is prevented from energization and the carriage is prevented from shifting, indicating by this fact to the operator the incorrectness of the perforation. In this case the release key of the machine is to be depressed so that the carriage will feed the card to the extreme left hand position where the wrong card may be removed and replaced by a new one which is properly punched.

If the upper hole combination deck is completely verified and has been found correct, the carriage is again in its extreme left hand position; thereupon it may be moved again to the right hand position and switch 93 may be moved into its lower position so that now the various columns of the lower hole combination deck may be verified successively in the same way as previously the upper hole combination deck. The fact that there are hole combinations in the lower deck comprising less hole positions and comprising in part only a single hole, is of no influence upon the operation of the machine and the result of the verification, as may be clearly recognized from the foregoing specification and the drawings.

Now the operation of the machine will be described in connection with the various possibilities of incorrect perforation.

If the record column to be verified comprises more holes or holes in other positions than correspond to the actuated verifier key, the controlling magnets of those positions will be compensated in their magnetic influence on which the holes of the column to be verified and the contact fingers 64 (Fig. 11) of the actuated key are in agreement. However, the additional holes will energize the analyzing windings of the coordinated controlling magnets 71 and since said analyzing windings are not compensated, the armature plate 75 will be rocked and contact 80 will be opened, thereby preventing in the aforesaid manner shifting of the card carriage.

If, however, the reverse case occurs, i. e. if the hole combination to be verified comprises less holes as corresponds to the actuated verifier key, the windings of the controlling magnets 71 controlled by holes and contact fingers 64 of identical hole positions will again be compensated; the verifier key comprising, however, in this case more contact fingers 64 than there are holes in the record column, the key windings coordinated to these contact fingers will cause opening of the carriage shift contact 80, thereby disabling shifting of the carriage.

If therefore a hole combination of a certain record column and the contact fingers 64 of an actuated verifier key are only in agreement in certain positions, the analyzing or key windings coordinated to the holes and contact fingers which are not in agreement will become energized individually and independently from each other and the carriage feed will be disabled in the above described manner.

If the holes in the column to be verified are provided in positions different from the arrangement of the contact fingers 64 of the actuated verifier key, the analyzing windings of the magnets 71 will be energized in those positions on which there are holes in the column, as well as the key windings of those magnets which are under the control of contact fingers 64, and in this case a series of magnets 71 will be energized to open the contact 80 thereby disabling the carriage shift mechanism.

If in a record column in which a certain perforation should be provided there is no hole at all, no analyzing windings of the magnets 71 will be energized; however, all key windings coordinated to the analyzing fingers 64 of the actuated verifier key will be energized and in this case the contact 80 will again be interrupted to indicate to the operator the present incorrectness of the absent perforation.

If in a record column to be verified no hole shall be provided, the no-perforation verification key 44 (Figs. 1, 5, and 11) will be depressed. As has been described this key 44 comprises no contact fingers cooperating with the bars 60 or 61 respectively, so that upon actuation of said key, no analyzing windings of magnets 71 may be energized. This no-perforation key acts however upon the stirrup 48, 49, 50, common to all keys, and closes thereby also the contacts 56 and 57. If now in the column to be verified and which should not have been punched, there is actually one or even a plurality of holes, the corresponding analyzing windings of the magnets 71 will be energized, thereby again preventing the carriage feed by interrupting contact 80 before closure of contact 57 becomes effective.

If it is desirable to shift the carriage for a certain number of columns step by step independently of any verification of the card, the shift key 45 (Figs. 1, 2 and 11) must be depressed, thereby closing the contact 68 and connecting the carriage shift magnet 29 directly to the current source. During this operation no influence may be effected upon the magnets 71 by the holes of the card since the contact 56 remains open due to the above described offset 66 (Fig. 4) of the keys 45 and 46 which will not cause any rocking of the stirrup 48, 49, 50.

In case that the carriage shall be released from any of its positions and returned to its left hand home position, as is necessary if upon detection of any incorrectness in any column of the card the latter is to be removed from the machine, the release key 46 must be depressed. Thereby the releasing magnet 31 (Fig. 11) will be connected over the resistance 96 and the contact 69 controlled by the key 46 directly to the current source and therewith the carriage is released in the above described manner from the escapement 21 (Fig. 2) and is drawn to its left hand home position.

While there have been shown and described and pointed out the fundamental novel features of the invention it will be understood that various omissions and substitutions and changes in the form and details of the machine illustrated and in its operation may be made by those skilled in the art without departing from the spirit of the invention.

What I claim is:

1. A verifying machine for perforated record cards having a plurality of superpositioned record decks, each deck comprising a plurality of adjacent record columns, said machine including a set of verifier keys for a single record column adapted for verification of a record deck column by column and being common to said plurality of record decks, error detecting means under the joint control of said verifier keys and the record column under verification, and means for selecting any one of said plurality of record decks for verification by said common set of verifier keys for a single record column.

2. In a verifying machine for perforated record cards having a plurality of superpositioned record decks, each deck comprising a plurality of adjacent record columns, a set of verifier keys for a single record column, error detecting means under the joint control of said set of keys and a single record column under verification, means for feeding said record card column by column relatively to said error detecting means upon key actuation, and means for selectively verifying the columns in any one of said record decks by said set of verifier keys for a single record column.

3. A verifying machine for hole combinational record cards having a plurality of superpositioned record decks, each deck comprising a plurality of adjacent hole combinational record columns, said machine including a set of verifier keys for a single hole combinational record column adapted for verification of a record deck column by column and being common to said plurality of record decks, error detecting means under the joint control of said verifier keys and the hole combinational record column under verification, and means for selecting any one of said plurality of record decks for verification by said common set of verifier keys for a single hole combinational record column.

4. In a verifying machine for hole combinational record cards having a plurality of superpositioned record decks, each deck comprising a plurality of adjacent hole combinational record columns, a set of verifier keys for a single hole combinational record column, error detecting means under the joint control of said set of keys and a single hole combinational record column under verification, means for feeding said record card column by column relatively to said error detecting means upon key actuation, and means for selectively verifying the columns in any one of said record decks by said set of verifier keys for a single hole combinational record column.

5. In a verifying machine for perforated record cards having a plurality of superpositioned record decks, each deck comprising a plurality of adjacent record columns, a set of verifier keys for a single record column adapted for verification of a record deck column by column and being common to said plurality of record decks, error detecting means under the joint control of said verifier keys and the record column under verification, and means for selecting any one of said plurality of record decks for verification by said common set of verifier keys for a single record column, the selecting positions of said selecting means corresponding to the location of the record deck on the card.

6. In a verifying machine for perforated record cards having a plurality of superpositioned record decks, each deck comprising a plurality of adjacent record columns, a stationary set of verifier keys for a single record column, stationary error detecting means being under the joint control of said verifier keys and the record column under verification, means for feeding said record card column by column relatively to said stationary error detecting means and means for selectively verifying any one of said plurality of record decks by said set by verifier keys for a single record column.

7. In a verifying machine for perforated record cards having a plurality of superpositioned record decks, each deck comprising a plurality of adjacent record columns, an individual set of analyzing means for each record deck, a set of verifier keys provided for a single record column and adapted to coact with said analyzing means in the verification operation column by column, error detecting means under the joint control of said analyzing means and said verifier keys, and shifting means common to all keys of said set of keys for selectively and operatively connecting said common set of keys to any one of said sets of analyzing means.

8. In a verifying machine for hole combinational record cards having a plurality of superpositioned record decks, each deck comprising a plurality of adjacent hole combinational record columns, an individual set of analyzing means for each record deck, a set of verifier keys provided for a single hole combinational record column and adapted to coact with said analyzing means in the verification operation column by column, error detecting means under the joint control of said analyzing means and said verifier keys, and shifting means common to all keys of said set of keys for selectively and operatively connecting said common set of keys to any one of said sets of analyzing means.

9. In a verifying machine for perforated record cards having a plurality of superpositioned record decks, each deck comprising a plurality of adjacent record columns, an individual set of analyzing means for a single record column for each record deck, a common set of verifier keys provided for a single record column and adapted to coact with said analyzing means, means for feeding said perforated record card column by column past said analyzing means upon key actuation, error detecting means under the joint control of said analyzing means and said verifier keys, and shifting means common to all keys of said set of keys for selectively and operatively connecting said common set of keys for a single record column to any one of said sets of analyzing means for a single record column of said plurality of record decks.

10. In a verifying machine for perforated record cards having a plurality of superpositioned record decks, each deck comprising a plurality of adjacent record columns, an individual set of analyzing means for each record deck, a set of verifier keys provided for a single record column and adapted to coact with said analyzing means in the verification operation column by column, common error detecting means for said plurality of record decks, said error detecting means being under the joint control of said analyzing means and said verifier keys, and shifting means common to all keys of said set of keys for selectively and operatively connecting said common error detecting means and said common set of keys to any one of said sets of analyzing means.

11. In a verifying machine for perforated record cards having a plurality of superpositioned record decks, each deck comprising a plurality of adjacent record columns, an individual set of analyzing means for each record deck, a set of verifier keys provided for a single record column and adapted to coact with said analyzing means in the verification operation column by column, common error detecting means for said plurality of record decks, said error detecting means being under the joint control of said analyzing means and said verifier keys and being in permanent operative connection with said set of verifier keys, and shifting means common to all keys of said set of keys for selectively and operatively connecting said common error detecting means to any one of said sets of analyzing means.

12. In a verifying machine for perforated record cards having a plurality of superpositioned record decks, each deck comprising a plurality of adjacent record columns, an individual set of electrical analyzing contacts for a single record column for each record deck, a common set of verifier keys provided for a single record column and adapted to coact with said analyzing contacts, means for feeding the record card column by column past said analyzing contacts upon key actuation, common electrical error detecting means for said plurality of record decks, said electrical error detecting means being under the joint control of one set of analyzing contacts and said set of verifier keys, said error detecting means being operatively connected to said verifier keys and including means for preventing feeding of said perforated record card upon detection of an error, and shifting means common to all keys of said set of keys for selectively and operatively connecting said common error detecting means to an one of said sets of analyzing contacts for a single record column.

13. In a verifying machine for hole combinational record cards having a plurality of superpositioned record decks, each deck comprising a plurality of adjacent record columns, an individual set of electrical analyzing contacts for a single hole combinational record column for each deck, a set of verifier keys provided for a single record column, means for feeding said record card column by column past said analyzing means upon key actuation, electrical error detecting means operatively connected to said verifier keys and under the joint control of said analyzing means and said verifier keys, said error detecting means including electrical means for preventing feeding of said record card past said analyzing means upon detection of an error, and shifting means common to all keys of said set of keys for selectively connecting said set of keys to any one of said sets of analyzing contacts for selectively verifying any one of said decks by the common set of keys.

14. In a verifying machine for hole combinational perforated record cards having a plurality of superpositioned record decks, each deck comprising a plurality of adjacent record columns, an individual set of electrical analyzing contacts for a single record column for each deck, a set of verifier keys provided for a single record column, means for feeding said record card column by column past said analyzing means upon key actuation, electrical error detecting means operatively connected to said verifier keys and including a set of magnets for comparing the perforations in the record column under verification and the actuated key and including electrical means under the control of said set of magnets for preventing feeding of said record card past said analyzing means upon detection of an error, and shifting means common to all keys of said set of keys for selectively connecting said set of comparing magnets to any one of said sets of analyzing contacts for selectively verifying any one of said hole combinational decks by said common set of keys.

15. In a verifying machine for perforated record cards having a plurality of superpositioned record decks, each deck comprising a plurality of adjacent record columns, an individual set of analyzing means for each record deck, a set of verifier keys provided for a single record column and adapted to coact with said analyzing means in the verification operation column by column, error detecting means under the joint control of said analyzing means and said verifier keys, and shifting means common to all keys of said set of keys for selectively and operatively connecting said common set of keys to any one of said sets of analyzing means, the shifting positions of said shifting means corresponding to the location of the record decks on the card.

16. A verifying machine as specified in claim 15 for perforated record cards having a lower and an upper record deck, wherein said common shifting means include a switch having a handle adjustable in an upper and a lower position and connecting the set of verifier keys in any one of its positions to the corresponding record deck.

MICHAEL MAUL.